United States Patent [19]
Pleus

[11] 3,805,952
[45] Apr. 23, 1974

[54] GRADER APPARATUS
[75] Inventor: Edwin F. Pleus, Sun Prairie, Wis.
[73] Assignee: Aunt Nellie's Foods, Inc., Clyman, Wis.
[22] Filed: June 21, 1973
[21] Appl. No.: 372,223

[52] U.S. Cl. .................................. 209/98, 209/394
[51] Int. Cl. ............................................. B07b 13/04
[58] Field of Search .......... 209/86, 95, 97, 98, 289, 209/290, 394, 398, 402, 406

[56] References Cited
UNITED STATES PATENTS
1,409,353  3/1922  Adamson ............................ 209/394
2,484,318  10/1949  Smith .................................. 209/394

Primary Examiner—Richard A. Schacher
Attorney, Agent, or Firm—Michael, Best & Friedrich

[57] ABSTRACT

A grader apparatus including first and second cage assemblies, each of which is comprised of a pair of end rings interconnected by a plurality of annularly spaced bar members fastened at their opposite ends to the end rings. The end rings of the two cage assemblies have the same inside diameter and both cage assemblies have a common central axis. The bar members of the first cage assembly extend through the end rings of the second cage assembly with such bar members being positioned between and spaced from the bar members of the second cage assembly so that such cage assemblies can be rotated with respect to each other to thereby adjust the spacing between adjacent bar members. A support means is provided for rotatably supporting the cage assemblies for rotation about their common central axis, such cage assemblies being positioned so that such axis is substantially horizontal. A drive means including a ring gear mounted on the outer surface of one of the end rings is provided for rotating the cage assemblies.

10 Claims, 6 Drawing Figures

PATENTED APR 23 1974

GRADER APPARATUS

BACKGROUND OF THE INVENTION

1. Field of Invention

This invention relates to grader apparatus and more particularly to graders for items such as beets, carrots, potatoes, etc.

2. Description of Prior Art

In all prior bar type graders known to applicant the spacing between the bars (grade setting) was adjusted by actual removal and reattachment of the bars to the end rings to provide the spacing required. The present invention represents a substantial improvement over such prior arrangements in that adjustment of the bar spacing is accomplished by simply rotating one cage assembly with respect to the other.

SUMMARY OF THE INVENTION

A grader apparatus comprising a ring and bar assembly including two pairs of spaced ring members all having the same inside diameter and a common central axis. A plurality of annularly spaced elongated bar members are interconnected between said pairs of spaced ring members with alternate bar members fastened to only one ring member of each spaced pair and the remaining bar member fastened to the other ring member of such spaced pairs so that the annular spacing between alternate bar members can be adjusted by relative rotation of one ring member of each pair with the other ring member of each pair. A support means is provided for rotatably supporting said ring and bar assembly for rotation about the common axis thereof, such assembly being positioned so that the common central axis is substantially horizontal. A drive means including a ring gear mounted on the outer surface of one of the ring members is provided for rotating the entire assembly.

DESCRIPTION OF THE PREFERRED EMBODIMENT

The grader apparatus 4 of the present invention in its simplest form is comprised of a pair of cage assemblies 6 and 8 mounted for relative rotational movement with respect to each other as will be described in detail hereinafter.

Figure 4:
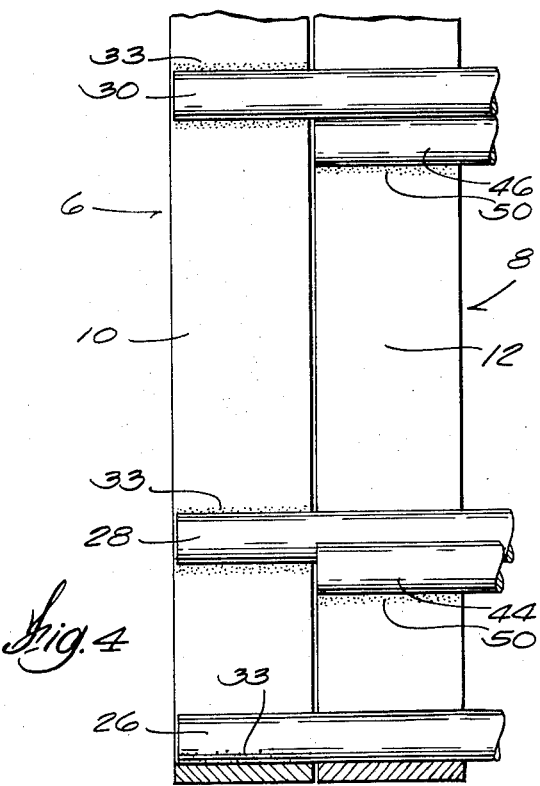
FIG. 4 is an enlarged fragmentary sectional view taken along line 4—4 of FIG. 1.
Figure 3:
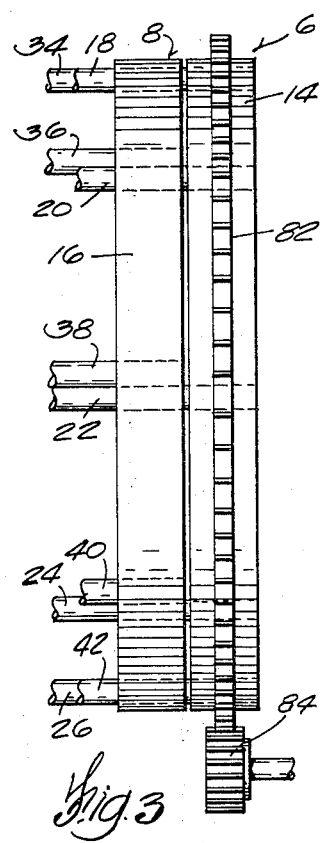
FIG. 3 is a fragmentary side view similar to FIG. 1 but showing the other end of the grader apparatus.

Cage assemblies 6 and 8 are of similar construction and are mounted one within the other to provide a single grader apparatus as will now be described. Cage assembly 6 is comprised of a pair of end ring members 10 and 14 interconnected by a plurality of annularly spaced bar members 18, 20, 22, 24, 26, 28, 30 and 32 which are securely fastened at opposite ends thereof the the inner surface of rings 10 and 14 by any suitable means such as by a weld 33 as shown in FIG. 4. Cage assembly 8 is comprised of a pair of end ring members 12 and 16 interconnected by a plurality of annularly spaced bar members 34, 36, 38, 40, 42, 44, 46 and 48 securely fastened at their opposite ends to the inner surface of ring members 12 and 16 by any suitable means such as by welds 50 as shown in FIG. 4. Rings 10, 12, 14 and 16 are all of the same diameter which in one commercial embodiment is approximately 36 inches.

Figure 1:
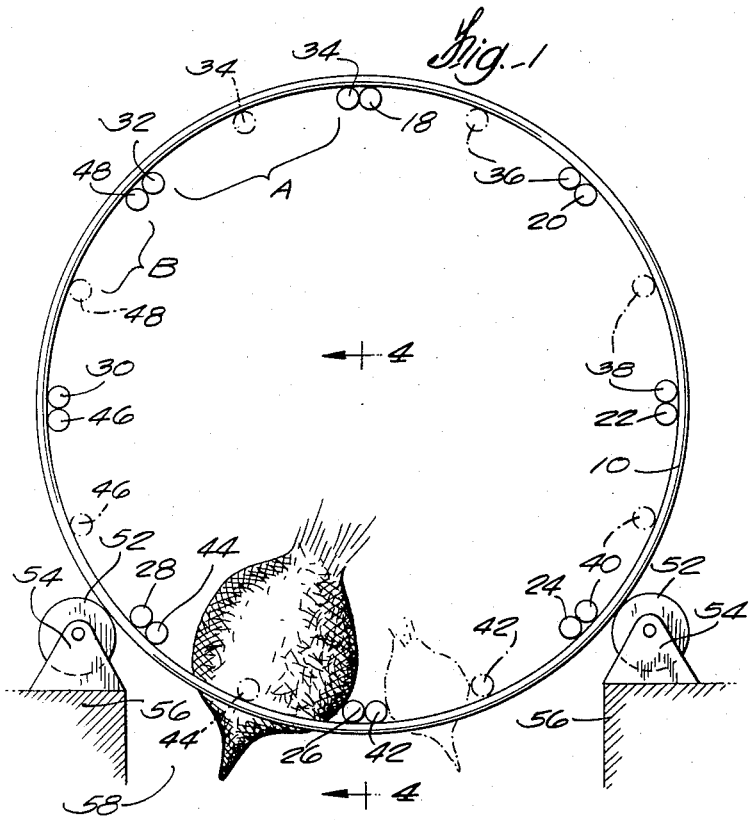
FIG. 1 is an end view of the grader apparatus of the present invention.
Figure 2:
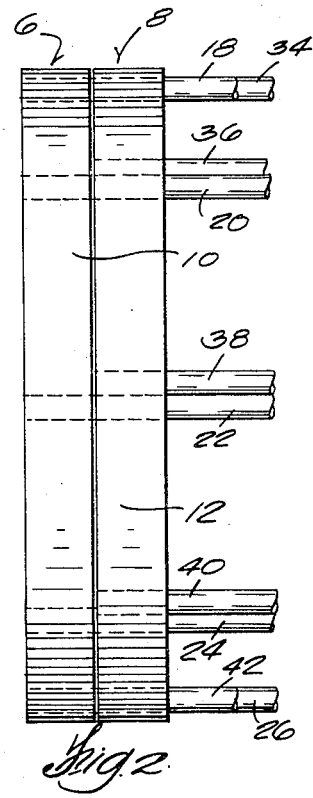
FIG. 2 is a fragmentary side view of the apparatus shown in FIG. 1 showing one end of the grader apparatus.
Figure 6:
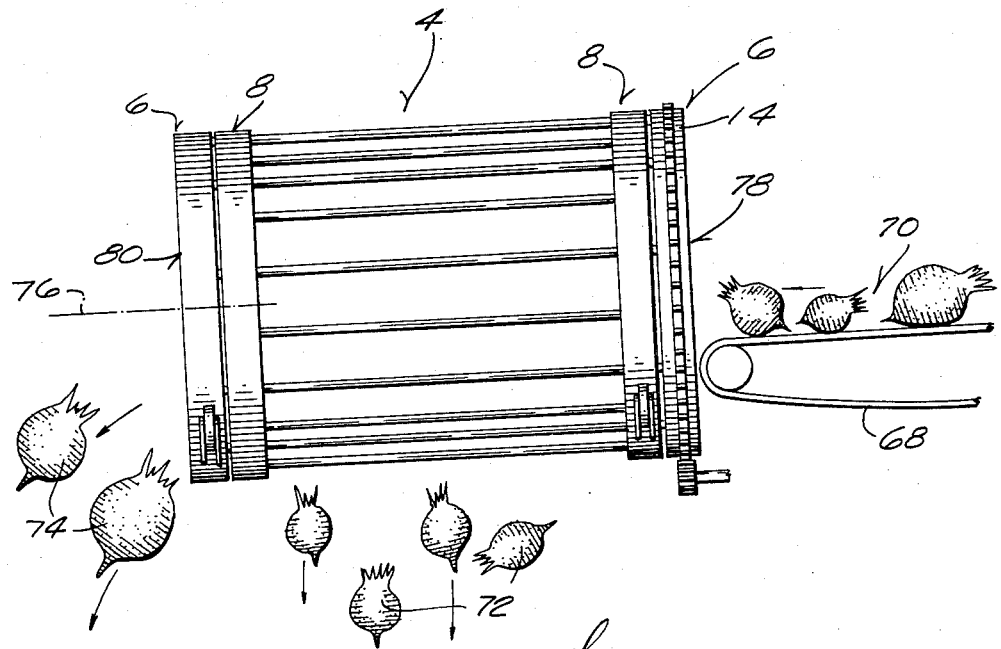
FIG. 6 is a partially schematic side elevation view of the grader apparatus.

As best shown in FIGS. 1 and 6, the entire grader apparatus is mounted for rotation about its axis 76 by support rollers 52 mounted at opposite ends of the grader apparatus. Each pair of support rollers 52 is mounted at opposite ends of the grader by means of suitable bracket supports 54 which in turn are mounted on a suitable support structure 56. A central opening 58 is provided in the support structure 56 to allow the graded material to pass through the grader apparatus into a suitable collection receptacle (not shown) as will be described hereinafter.

As best shown in FIG. 6, the axis 76 of the grader is tilted slightly downwardly from its inlet end 78 to its outlet end 80. The degree of pitch required will depend on the type of material to be graded and the desired through-put. For most applications it will fall within the range of ¼–1 inch for each 4 feet of grader length.

The grader is rotated about its horizontal axis by any suitable means such as a ring gear 82 mounted on ring member 14 and a drive gear 84 which is driven by any suitable prime mover (not shown).

It will be appreciated that by first fabricating cage assembly 6 and then fabricating cage assembly 8 (or vice versa) with the end rings 12 and 16 of assembly 8 positioned inwardly and adjacent to end rings 10 and 14 of assembly 6 the two assemblies will be structurally interconnected with each other and at the same time will be rotatable adjustable with respect to each other.

Figure 5:
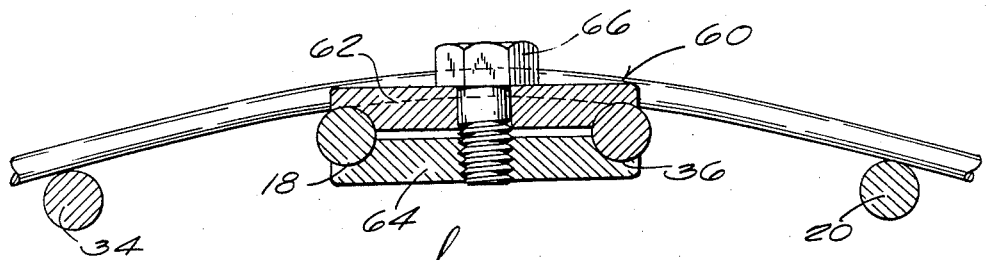
FIG. 5 is a fragmentary end view showing the device for locking the grader apparatus in one of its adjustable positions.

The cage assemblies 6 and 8 are locked to each other to provide the desired grade setting by any suitable means such as the clamp device 60 as shown in FIG. 5.

Clamp device 60 is comprised of plate members 62 and 64 which are fitted between adjacent bar members 18 and 36 for example and then locked into engagement with such bar members by a machine screw 66 which extends through an opening in plate 62 into a threaded opening in plate 64. Plate members of different size will, of course, provide different grade settings. In the adjusted position shown in FIG. 5, the cage assemblies have been rotated relative to each other to position bar 36 about midway between bars 18 and 20 to thereby provide the finest grade setting available. To provide coarser grade settings plate members of smaller size must be used.

OPERATION

Referring to FIG. 6, the material 70 to be graded is introduced into the inlet end 78 of the grader 4 by any suitable means such as a conveyor 68. As previously indicated, the grader apparatus of this invention can be used to grade a variety of different items such as beets, carrots, potatoes, etc. In the FIG. 6 illustration beets 70 of various size are shown. Due to the rotation of the grader apparatus and the slight downward pitch of its central axis, the beets 70 introduced into inlet end 78 will move through the grader to outlet end 80. The beets 72 of a size small enough to pass through the openings between the adjacent bars of the grader will fall down into the area beneath the grader and the beets 74 of a size greater than such openings will pass out the outlet end 80 of the grader. In some installations a second, third or even a fourth grader apparatus (not shown) will be mounted in series with the first grader to provide further grading of the beets 74. Such subsequent graders will, of course, be adjusted to provide an increasingly coarser grade setting from that of the first grader.

As indicated previously, the principal advantage of the present grader apparatus over prior known graders is the ease with which the grade setting can be adjusted. By constructing the overall grader 4 from two sub-assemblies 6 and 8 which can be rotated relative to each other, it is a relatively simple matter to change the grade setting of the grader. This is accomplished by simply removing the clamping device 60, readjusting the spacing between adjacent bar members and then reinstalling a different clamping device of the proper size for the grade setting selected. More specifically, the particular grader apparatus shown in FIG. 1 can be adjusted between its coarsest setting as indicated by reference letter A and its finest setting as indicated by reference letter B by rotating the cage assemblies 6 and 8 relative to each other.

I claim:

1. A grader apparatus comprising:
   a first cage assembly comprising a pair of end rings interconnected by a plurality of annularly spaced bar members fastened at their opposite ends to said end rings;
   a second cage assembly comprising a pair of end rings interconnected by a plurality of annularly spaced bar members fastened at their opposite ends to said end rings, said first and second cage assemblies having a common central axis and the end rings of said first and second cage assemblies having the same inside diameter with the bar members of said first cage assembly extending through the end rings of said second cage assembly, such bar members being positioned between said bar members of said second cage assembly so that said first and second cage assemblies can be rotated with respect to each other;
   support means for rotatably supporting said cage assemblies for rotation about their common central axis, said cage assemblies being positioned so that said common central axis thereof is substantially horizontal; and
   a drive means for rotating said cage assemblies.

2. A grader apparatus according to claim 1 in which the common central axis of said cage assemblies is tilted slightly downwardly from the inlet end of said assemblies to the outlet end of said assemblies.

3. A grader apparatus according to claim 1 in which said apparatus includes a clamping device for clamping said cage assemblies to each other at a desired grade setting.

4. A grader apparatus according to claim 1 in which said bar members of said first and second cage assemblies are fastened to the inner surface of said end rings.

5. A grader apparatus comprising:
   a ring and bar assembly including a first pair of ring members having the same inside diameter and positioned adjacent each other on a common central axis;
   a second pair of ring members spaced from said first pair of ring members and having the same inside diameter as said first pair of ring members, said second pair of ring members positioned adjacent each other on the same common axis as said first pair of ring members;
   a plurality of annularly spaced elongated bar members extending between said pairs of spaced ring members with alternate bar members fastened to only one ring member of each of said spaced pairs and the remaining bar members fastened to the other of said spaced pairs of ring members so that the annular spacing between alternate bar members can be adjusted by relative rotation of one ring member of each pair thereof with the other ring member of each pair thereof;
   support means for rotatably supporting said ring and bar assembly for rotation about said common central axis, said ring and bar assembly being positioned so that said common central axis thereof is substantially horizontal; and
   a drive means for rotating said ring and bar assembly.

6. A grader apparatus according to claim 5 in which every other annularly spaced bar member is fastened to the outer end ring member of each pair thereof and the remaining bar members are fastened to the inner ring member of each pair thereof.

7. A grader apparatus according to claim 5 in which the common central axis of said ring and bar assembly is tilted slightly downwardly from the inlet end thereof to the outlet end thereof.

8. A grader apparatus according to claim 5 in which said apparatus includes a clamping device for clamping adjacent bar members to each other at a desired grade setting.

9. A grader apparatus according to claim 5 in which said bar members are fastened to the inner surface of said ring members.

10. A grader apparatus according to claim 5 in which said drive means includes a ring gear mounted on the outer surface of one of said ring members.

* * * * *